April 21, 1964 G. M. WARNER 3,129,747
AUXILIARY FUEL SUPPLY DEVICE
Filed Dec. 19, 1961 2 Sheets-Sheet 1
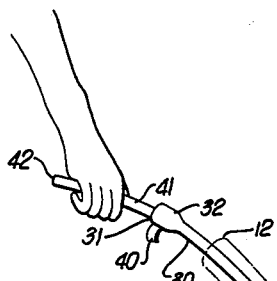
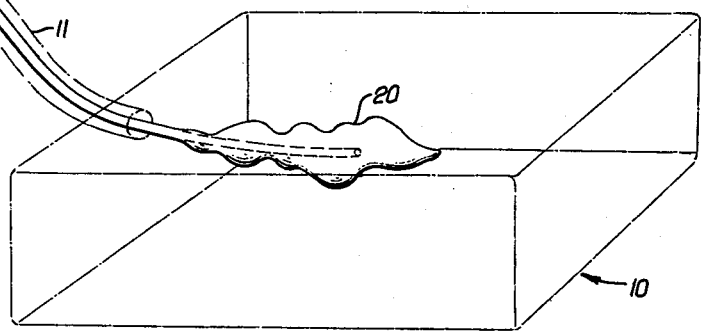
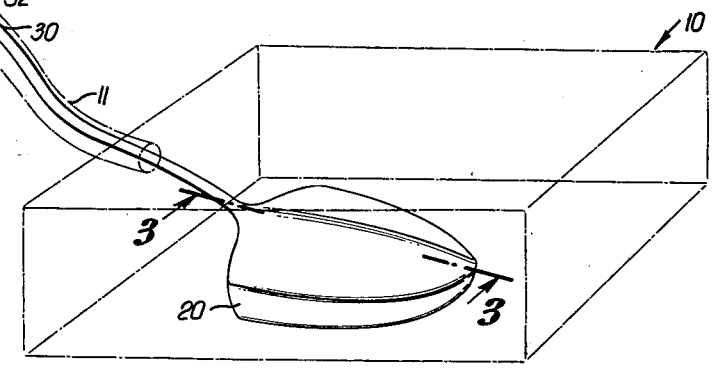
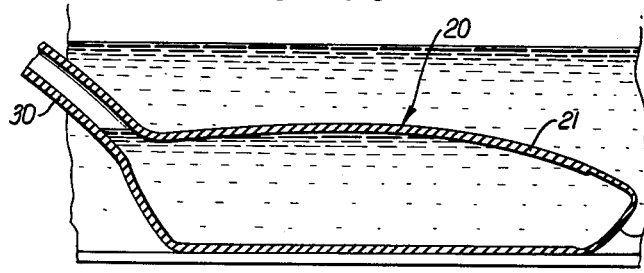
GLENN MORSE WARNER
INVENTOR.
BY Huebner & Worrel
ATTORNEYS.

April 21, 1964  G. M. WARNER  3,129,747
AUXILIARY FUEL SUPPLY DEVICE
Filed Dec. 19, 1961  2 Sheets-Sheet 2
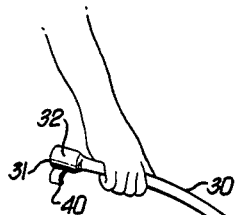
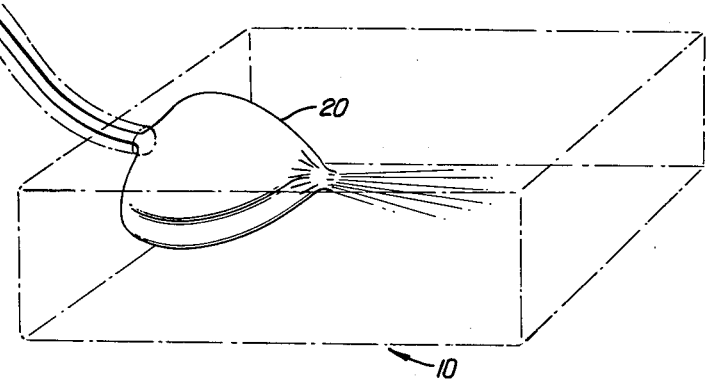
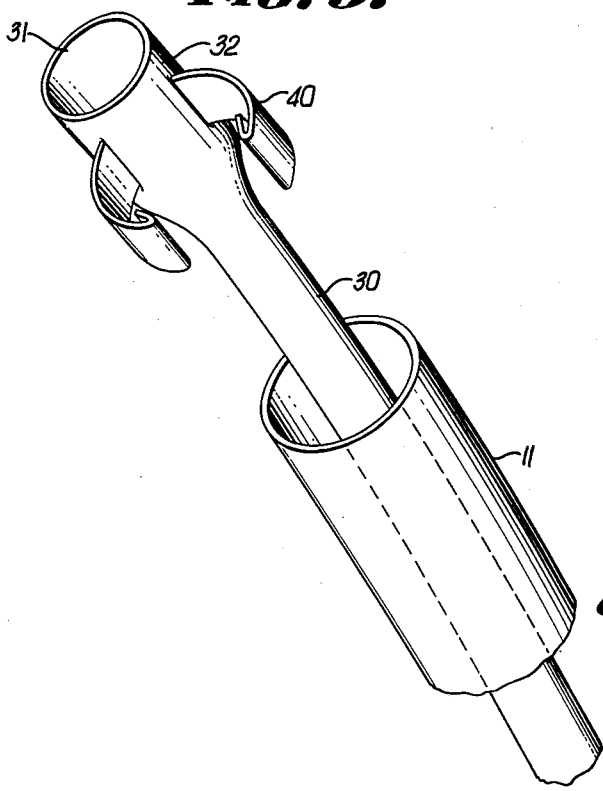
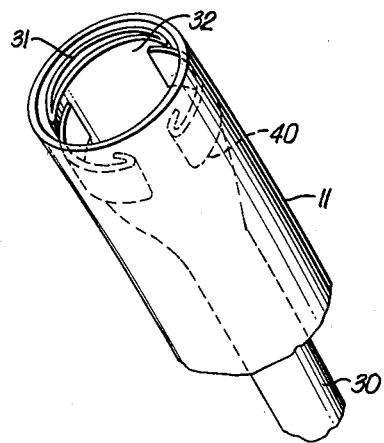
GLENN MORSE WARNER
INVENTOR.
BY Huebner & Worrel
ATTORNEYS.

3,129,747
AUXILIARY FUEL SUPPLY DEVICE
Glenn M. Warner, Norco, Calif., assignor to Briles
Manufacturing, El Segundo, Calif., a partnership
Filed Dec. 19, 1961, Ser. No. 160,579
1 Claim. (Cl. 158—46.5)

This invention relates to an auxiliary fuel supply device and more particularly to a collapsible bladder for holding an emergency auxiliary supply of fuel, which said bladder is adaptable to be inserted into a fuel tank (such as the fuel tank of an automotive vehicle), filled with fuel which it will retain until it is desired to discharge the fuel therefrom into the fuel tank, and then ruptured and withdrawn from the fuel tank.

"Running out of gas" is a well known tribulation of motorists. It not only results in great inconvenience and loss of time, but also it can be extremely hazardous, especially if it occurs on a busy highway.

It is the primary object of the present invention to provide a device which will substantially eliminate the inconvenience and danger of "running out of gas," which may have occurred through carelessness or by reason of a faulty gas gauge.

It is another object of the invention to provide such a device which is easy to install in the fuel tank and filler pipe assembly of an automobile; which is inexpensive to manufacture; and which is readily removable and disposable when it has served its purpose of furnishing an auxiliary fuel supply.

With these and other objects in view, the invention consists of the construction, arrangement and combination of the various parts of the device whereby the objects contemplated are attained, as hereinafter set forth, pointed out in the appended claim, and illustrated in the accompanying drawings.

In the drawings:

FIGURE 1 is a partly diagrammatic view, partially in phantom, showing the device of the present invention being inserted into a fuel tank assembly.

FIGURE 2 is a view similar to FIGURE 1, but showing the device of the present invention in fully mounted, inflated position.

FIGURE 3 is an enlarged, sectional view taken on the line 3—3 of FIGURE 2.

FIGURE 4 is a view similar to FIGURE 1, but showing the device of the present invention being deflated and withdrawn from the fuel tank assembly.

FIGURE 5 is an enlarged, detailed, side elevational view showing the neck of the device of the present invention partially inserted in the fill pipe of the fuel tank assembly.

FIGURE 6 is a view similar to FIGURE 5, but showing the neck of the device of the present invention fully inserted in the fill pipe of the fuel tank assembly.

A fuel tank 10 is illustrated in the drawings. A tank inlet filler tube or pipe 11, having an open end 12, is mounted on tank 10 and provides means for introducing fuel into tank 10.

A bag or bladder 20, of any desirable shape, is made of any suitable pliable material which is resistant to the fuel to be contained therein, various plastic materials being satisfactory. Said bladder 20 is of a capacity to hold a reasonable supplemental supply of fuel, and by way of illustration, but not by way of limitation, a capacity of from one to two gallons is suggested.

The walls 21 of bladder 20 are generally of sufficient thickness to retain the fuel contained therein and to maintain bladder 20 against inadvertent rupture due to vibration and shock, but, as best illustrated in FIGURE 3 of the drawings, one section 22 of said walls 21 is made substantially thinner than the rest of said walls 21, so as to provide an area of rupture which may be selectively produced in the manner hereinafter described. At the same time, section 22 of walls 21 is sufficiently strong to resist rupture by an insert rod, hereinafter described, when bladder 20 is being positioned in tank 10.

A flexible, elongate hose 30 is formed on or attached to bladder 20 and provides fluid access to the interior of bladder 20. Hose 30 is preferably formed on bladder 20 at a point on the walls 21 of bladder 20 opposite thinner section 22 of walls 21. Hose 30 has an outside diameter sufficiently small to permit the free disposition of hose 30 in pipe 11, with room in pipe 11 for the passage of fluid therethrough around hose 30. Hose 30 is also somewhat longer than pipe 11.

Hose 30 has an open end 31, at which an enlarged neck 32 is formed. Mounted on neck 32, by any suitable means, is a spring clamp 40, adapted to retain neck 32 adjacent open end 12 of pipe 11, and to prevent neck 32 from dropping through pipe 11. Preferably, as illustrated in the drawings, clamp 40 is semi-circular in configuration, and designed, when disposed adjacent open end 12 of pipe 11, to abut against the inside surface of pipe 11, compress neck 32, and retain neck 32 in compressed or partially collapsed condition adjacent end 12 of pipe 11. However, it will be understood that any similar clamping and collapsing means which will retain neck 32 in accessible compressed condition adjacent open end 12 of pipe 11, while still permitting the pumping of fluid into pipe 11 and the free flow thereof around neck 32 and hose 30 into tank 10, may be utilized.

As best shown in FIGURE 1 of the drawings, an insert rod 42 is provided. Insert rod 42 is preferably flexible, in order to accommodate itself to any bends in filler pipe 11. Insert rod 42 may be made of any suitable material, but it should be stiffer than both hose 30 and bladder 20. It is also longer than the combined length of hose 30 and bladder 20, so that when it is used to position bladder 20 in tank 10 and hose 30 in filler pipe 11, it will have a protruding end 41 extending beyond open end 31 of hose 30, and readily accessible for hand manipulation, as illustrated in FIGURE 1, when it is used for positioning bladder 20 and hose 30, in the manner hereinafter described.

In operation, bladder 20, collapsed, is inserted in open end 12 of filler pipe 11, and insert rod 42 is then inserted in hose 30 through open end 31 of hose 30, and moved inwardly until the end of insert rod 42 abuts against section 22 of walls 21 of bladder 20. Insert rod 42 is then used to push collapsed bladder 20 through filler pipe 11 until bladder 20 is inserted into tank 10, with a portion of hose 30 also inserted in tank 10, and until neck 32 of hose 30 is adjacent to open end 12 of filler pipe 11, but preferably before neck 32 is fully positioned in filler pipe 11.

Insert rod 42 is then withdrawn, and the required amount of fuel to substantially fill bladder 20 is introduced into hose 30 and bladder 20 through neck 32.

Hose 30 may then be further moved into filler pipe 11 until neck 32 of hose 30 is fully inserted in filler pipe 11, whereupon, clamp 40 is positioned in filler pipe 11 to compress neck 32 in pipe 11, and to retain neck 32 in pipe 11 closely adjacent to open end 12 of pipe 11, accessible for later grasping and removal, neck 32, as hereinabove mentioned, being then in compressed or flattened position to permit the introduction of fuel into filler pipe 11, around neck 32 and hose 30, and into tank 10 outside and around bladder 20.

If fuel in tank 10 around bladder 20 should become exhausted and the vehicle has "run out of gas," after removal of the normal cap (not illustrated) which is standard automotive equipment for automotive vehicles, one desiring to use the supplemental fuel supply contained in bladder 20, may reach into open end 12 of filler pipe 11 with his fingers, release clamp 40, and pull out neck 32 and enough of hose 30 to permit a firm grasp on hose 30. Hose 30 is then further pulled out of filler pipe 20 until walls 21 of bladder 20 provide an impact against the sides of tank 10 at the access point of filler pipe 11. When withdrawal pulling is continued, substantial pressure will build up in the fuel contained in bladder 20, and as the withdrawal pressure is further continued, bladder 20 will rupture at section 22 of walls 21, expelling the supplemental supply of fuel in bladder 20 into tank 10, where it will be available for feeding, in the normal manner, into the carburetor system of the vehicle's engine.

When all, or substantially all, of the fuel formerly contained in bladder 20 has been exhausted therefrom, further pulling on hose 30 will remove hose 30 and bladder 20, now collapsed, from filler pipe 11, after which it may be discarded.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent structures and devices.

What is claimed is:

An auxiliary fuel supply device which comprises: a flexible, collapsible bladder adapted to be inserted in a fuel tank through a filler pipe for said tank, and to contain an auxiliary supply of fuel after insertion in said fuel tank; a flexible hose connected to said bladder, said hose being adapted to be disposed in said fuel tank filler pipe, to provide fuel access to said bladder, and to serve as a handle for the withdrawal of the bladder from the fuel tank; clamp means for releasably retaining said hose in said pipe; a relatively thin wall section of said bladder, disposed on said bladder substantially opposite the connection of said hose to said bladder, said thin wall section being adapted to retain said auxiliary fuel supply in said bladder when said bladder is disposed in said fuel tank, and to rupture and release said auxiliary fuel supply from said bladder upon engagement of the bladder with the filler pipe when the bladder is being withdrawn from said fuel tank through said filler pipe; and a relatively flexible, elongate rod of rigid material removably insertable in the hose and adapted to dispose the hose in the filler pipe and insert the bladder in the fuel tank by engaging the thin wall section of the bladder without effecting rupture thereof.

References Cited in the file of this patent

UNITED STATES PATENTS

| | | |
|---|---|---|
| 1,979,203 | Mellon | Oct. 30, 1934 |
| 2,095,931 | Kraft | Oct. 12, 1937 |
| 2,971,576 | Anker | Feb. 14, 1961 |
| 3,043,424 | Howard | July 10, 1962 |
| 3,065,522 | Day et al. | Nov. 27, 1962 |
| 3,088,586 | Hardman | May 7, 1963 |